(12) United States Patent
Johns et al.

(10) Patent No.: US 7,845,935 B2
(45) Date of Patent: Dec. 7, 2010

(54) LIGHTWEIGHT KNOCKOUT FOR FORMING DIE ASSEMBLY

(75) Inventors: Albert D. Johns, Myrtle Beach, SC (US); Stephen K. Milligan, Florence, SC (US); Mircea Sofronie, Easton, PA (US)

(73) Assignee: Dixie Consumer Products LLC, Atlanta, GA (US)

( * ) Notice: Subject to any disclaimer, the term of this patent is extended or adjusted under 35 U.S.C. 154(b) by 126 days.

(21) Appl. No.: 11/933,454

(22) Filed: Nov. 1, 2007

(65) Prior Publication Data

US 2008/0124421 A1 May 29, 2008

Related U.S. Application Data

(60) Provisional application No. 60/864,438, filed on Nov. 6, 2006.

(51) Int. Cl.
*B29C 43/50* (2006.01)
(52) U.S. Cl. ............... 425/422; 425/351; 425/441; 425/443
(58) Field of Classification Search ............ 425/412, 425/422, 441, 443, 556, 577, 351; 249/68, 249/74
See application file for complete search history.

(56) References Cited

U.S. PATENT DOCUMENTS

| | | | | |
|---|---|---|---|---|
| 1,793,089 A | | 2/1931 | Heyes | |
| 3,470,284 A | * | 9/1969 | Hartmann | 264/119 |
| 3,672,807 A | * | 6/1972 | Genz | 425/422 |
| 3,865,529 A | * | 2/1975 | Guzzo | 425/556 |
| 4,123,495 A | * | 10/1978 | Abey | 264/318 |
| 4,342,442 A | * | 8/1982 | Perkins et al. | 249/67 |
| 4,479,914 A | * | 10/1984 | Baumrucker | 264/45.5 |
| 4,755,128 A | * | 7/1988 | Alexander et al. | 425/292 |
| 4,778,439 A | * | 10/1988 | Alexander | 493/169 |
| 4,832,676 A | | 5/1989 | Johns et al. | |
| 4,929,170 A | * | 5/1990 | Boskovic | 425/556 |
| 5,044,918 A | * | 9/1991 | Brussel | 425/397 |
| 5,087,188 A | * | 2/1992 | Staver | 425/116 |
| 5,281,127 A | * | 1/1994 | Ramsey | 425/556 |
| 5,356,284 A | * | 10/1994 | Sheffield | 425/556 |
| 5,429,492 A | * | 7/1995 | Taniyama | 425/556 |
| 5,447,426 A | * | 9/1995 | Gessner et al. | 425/436 R |
| 5,731,013 A | * | 3/1998 | vanderSanden | 425/183 |
| 5,868,988 A | * | 2/1999 | Budnick | 264/296 |
| 6,139,307 A | | 10/2000 | Plourde et al. | |
| 6,261,082 B1 | | 7/2001 | Han | |
| 6,506,330 B1 | * | 1/2003 | Schweigert et al. | 264/318 |
| 6,589,043 B1 | | 7/2003 | Johns et al. | |
| 6,761,844 B1 | * | 7/2004 | Haataja | 264/123 |
| 6,783,720 B2 | | 8/2004 | Johns et al. | |
| 7,063,868 B2 | * | 6/2006 | Axelrod | 426/512 |
| 7,070,729 B2 | | 7/2006 | Johns et al. | |
| 7,101,168 B1 | * | 9/2006 | Willemsen | 425/388 |

* cited by examiner

*Primary Examiner*—Yogendra N Gupta
*Assistant Examiner*—Emmanuel S Luk

(57) ABSTRACT

A die assembly for producing paperboard pressware includes a lightweight knockout assembly having a long and narrow ejection member positioned within a slotted adapter plate. The provision of a lightweight knockout assembly reduces frictional wear-related maintenance and downtime.

18 Claims, 6 Drawing Sheets

LIGHTWEIGHT KNOCKOUT FOR FORMING DIE ASSEMBLY

CROSS REFERENCE TO RELATED APPLICATIONS

This application is based upon U.S. Provisional Patent Application No. 60/864,438 of the same title filed Nov. 6, 2006. The priority of U.S. Patent Application No. 60/864,438 is hereby claimed and its disclosure incorporated herein by reference.

TECHNICAL FIELD

The present invention relates generally to press or die equipment for manufacturing, and more particularly to a lightweight knockout assembly for discharging formed items such as paperboard pressware from a forming press.

BACKGROUND

Die-press forming systems are used in the manufacture of a variety of shaped products. For example, a forming press system for making pressware containers from paperboard typically includes one or more forming die assemblies oriented on an inclined plane such that scored paperboard blanks are fed between upper and lower die components thereof by way of gravity. Generally, forming die assemblies include an upper male die member or "punch," and a lower female die member or "die," which are compressed together to shape and crimp the blank into the desired final product.

The female and/or male die members of a forming die assembly are commonly provided with one or more product ejectors or "knock-out" members for assisting in the removal of the formed product. For example, U.S. Pat. No. 7,070,729 to Johns et al., U.S. Pat. No. 6,783,720 to Johns et al., U.S. Pat. No. 4,755,128 to Alexander et al., and U.S. Pat. No. 1,793,089 to Heyes, are all incorporated herein for background information. These knockout members may serve a number of purposes in the manufacturing process. As a paperboard blank is fed into a die assembly, the bottom knockout may be raised to support and guide the blank into position over the lower die. As the die assembly is closed, the bottom knockout also commonly provides a clamping surface to hold the blank against the upper punch and maintain the blank on-center as it is pressed into the die and shaped into the desired product configuration. And when the die assembly is opened, the bottom knockout releases and ejects the formed product from the lower die.

Typically, the bottom knockout member of a forming die assembly is machined in the general shape of the product being produced (e.g., round, oval, rectangular, etc.), and having dimensions closely matching the bottom of the finished product surface area. For example, in a circular die assembly for forming circular pressware plates or bowls, the bottom knockout member is typically a circular disk having a diameter matching the full outer diameter of the bottom panel of the plate or bowl to be formed, and is mounted concentrically within the circular lower die. The bottom knockout member will typically be fabricated from the same material as the other die components, commonly ductile iron. As a result, known bottom knockout components tend to have substantial weight.

The considerable weight of known bottom knockout components, coupled with the high-speed cyclical nature of their operation, has been found to contribute significantly to wear and fatigue-related damage to supporting equipment. And because forming die assemblies are commonly oriented at an inclined angle to facilitate loading and discharge, friction wear of bushings supporting the bottom knockout components is accelerated, particularly on the "downhill" side of the bearing surfaces. Equipment misalignment resulting from wear of component surfaces may negatively affect product quality. Moreover, maintenance costs for replacement of worn components, as well as lost productivity due to equipment down-time during repairs, can significantly decrease production volume and profitability.

Accordingly, if can be seen that improvements to reduce the incidence of wear and other damage to components of forming press or die equipment are highly desirable in terms of improved product quality, greater productivity and increased profitability.

SUMMARY OF THE INVENTION

The present invention provides an improved product loading and/or discharge mechanism for press or die equipment used in manufacturing. While the improvements of the present invention may be applied to a variety of manufacturing processes, including for example sheet-metal stamping and injection molding, the invention will be described herein primarily with reference to example embodiments adapted to use in connection with forming press systems for manufacturing paperboard pressware. In example forms of the invention, an improved knockout assembly for a press forming apparatus has a substantially lower weight relative to previously known equipment, thereby significantly reducing wear-related damage and resultant maintenance costs and production downtime. Embodiments of the invention can readily be retrofit to existing equipment, and/or can be incorporated into a variety of new equipment designs.

In one aspect of the invention, a press-forming apparatus includes a male forming member and a female forming member. At least one of the male forming member and/or the female forming member include a product-forming surface having an elongated slot therein. The apparatus further includes an ejector movable between a retracted position within the elongated slot and an extended position projecting outward of the elongated slot.

In another aspect of the invention, an apparatus for forming a pressware product includes at least one die member having a lightweight knockout assembly mounted therein. The lightweight knockout assembly includes an adapter plate having a length and a width corresponding to respective dimensions of a bottom panel of the pressware product to be formed. The lightweight knockout assembly further includes an ejector having a length substantially equal to the length of the adapter plate and a width substantially less than the width of the adapter plate.

In still another aspect of the invention, an improved knockout assembly for a press is provided. The press forms a product between a first die member and a second die member, the first and second die members being formed of a die material. The improved knockout assembly includes an ejector and a stem for coupling the ejector to an actuator. At least one of the ejector and/or the stem are formed of a lightweight material relative to the die material.

In another aspect of the invention, a press-forming apparatus includes an upper die half and a lower die half, the lower die half having a generally planar bottom panel forming surface having a length extending in a machine direction and a width extending in a cross-machine direction. The press-forming apparatus further includes an ejection member having an upper surface movable between a forming position wherein the upper surface of the ejection member is generally in the plane of the bottom panel forming surface of the lower die half, and an ejection position wherein the upper surface of the ejection member is raised above the plane of the bottom panel forming surface of the lower die half. The ejection member has a maximum width in the cross-machine direction of no more than about 50% the width of the bottom panel forming surface of the lower die half.

In another aspect of the invention, a press-forming apparatus includes a lower die half having a generally planar bottom panel forming surface defining a first surface area, and a knockout member defining a second surface area. The knockout member is movable between a retracted position wherein the second surface area is generally aligned with the bottom panel forming surface of the lower die half, and an extended position wherein the second surface area projects beyond the bottom panel forming surface of the lower die half. The second surface area is no more than about 50% the first surface area.

In another aspect of the invention, a knockout for a press-forming apparatus includes an ejector body mounted to a stem. The stem has a cross-sectional dimension D, and the ejector body has a width W at a point of connection between the ejector body and the stem that is no greater than the cross-sectional dimension D of the stem.

These and other aspects, features and advantages of the invention will be understood with reference to the drawing figures and detailed description herein, and will be realized by means of the various elements and combinations particularly pointed out in the appended claims. It is to be understood that both the foregoing general description and the following brief description of the drawings and detailed description of the invention are exemplary and explanatory of suitable embodiments of the invention, and are not restrictive of the invention, as claimed.

DETAIL DESCRIPTION OF EXAMPLE EMBODIMENTS

Figure 1:
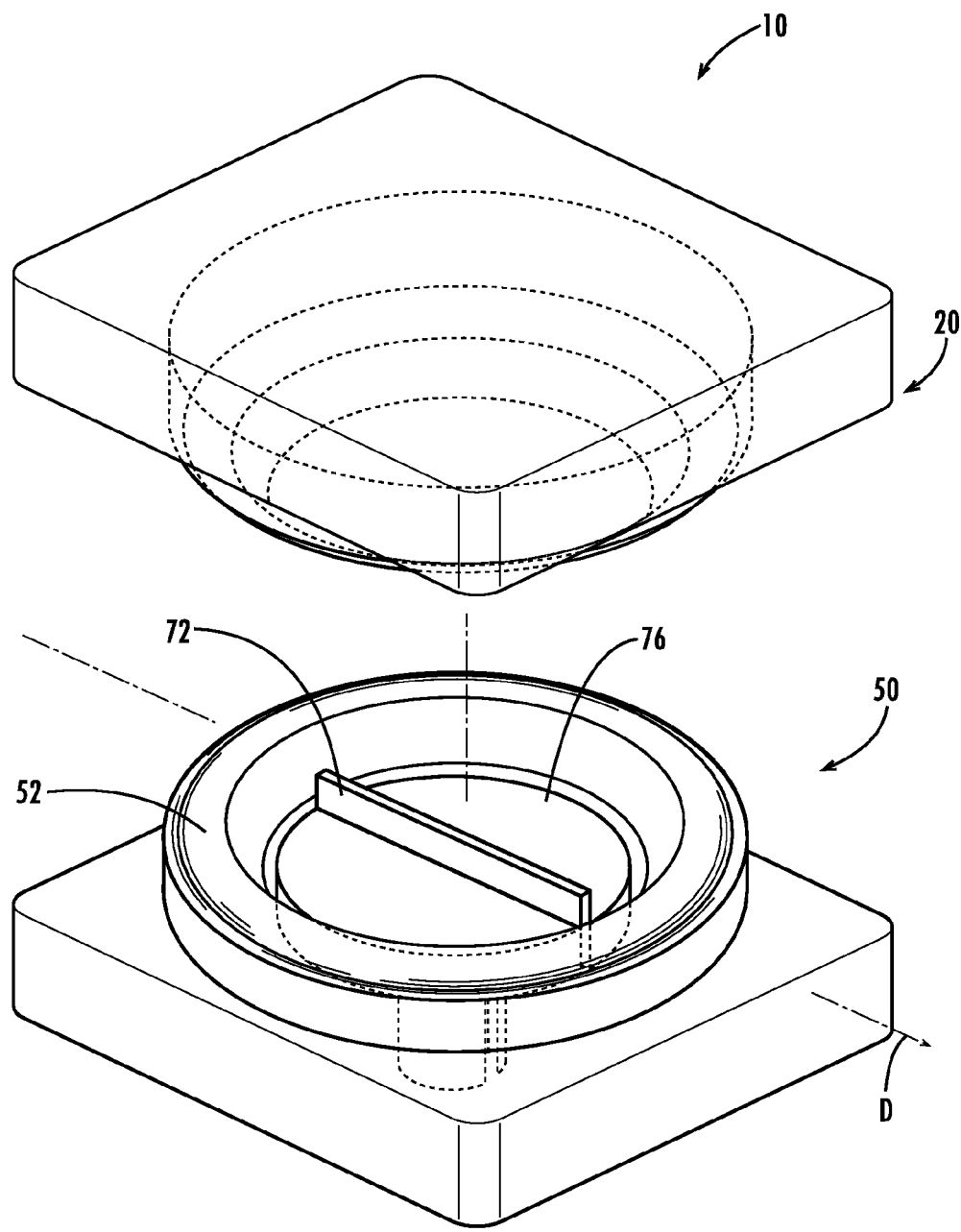
FIG. 1 is a perspective view of a die press forming system according to an example embodiment of the present invention, with pressure ring and draw ring components removed for clarity.
Figure 2:
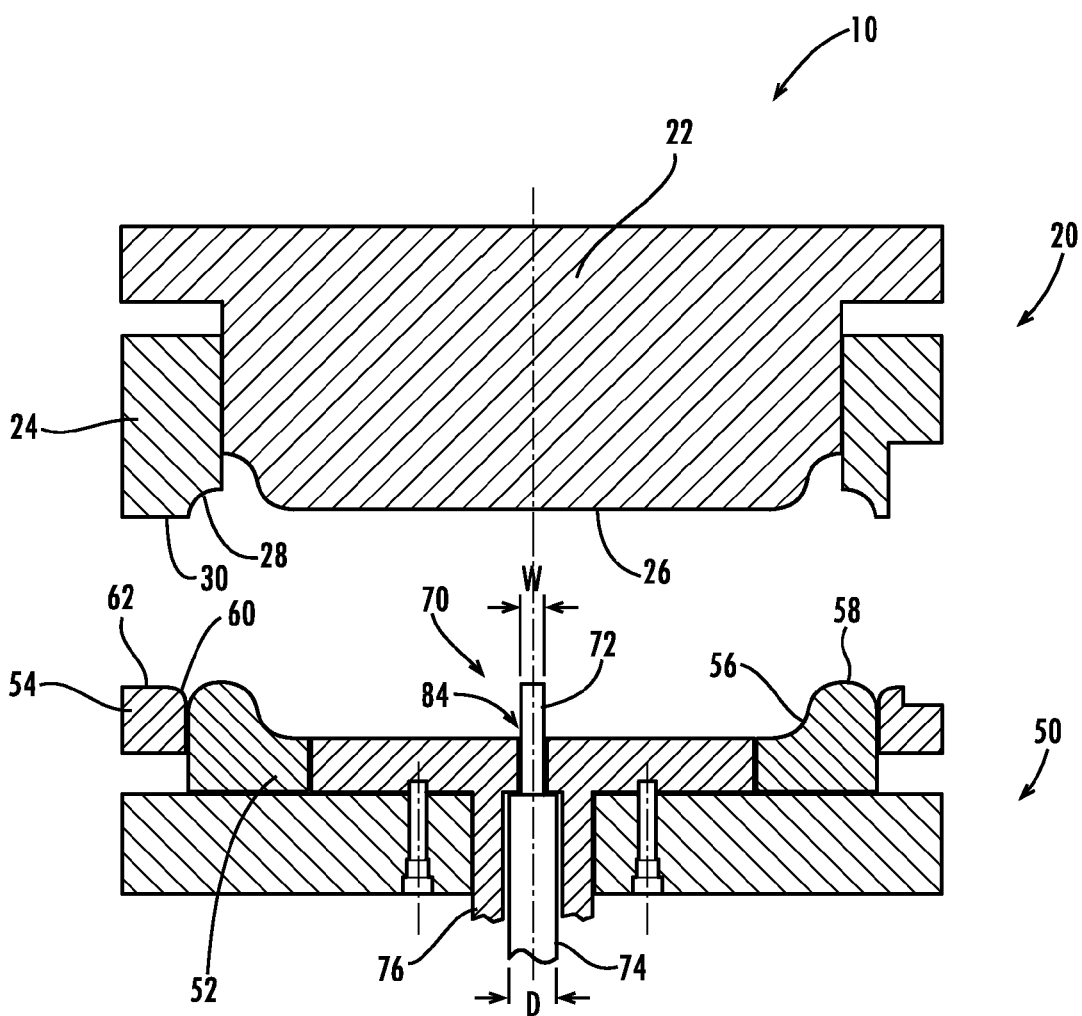
FIG. 2 is a first cross-sectional view of the die press system of FIG. 1, shown in an open configuration.
Figure 3:
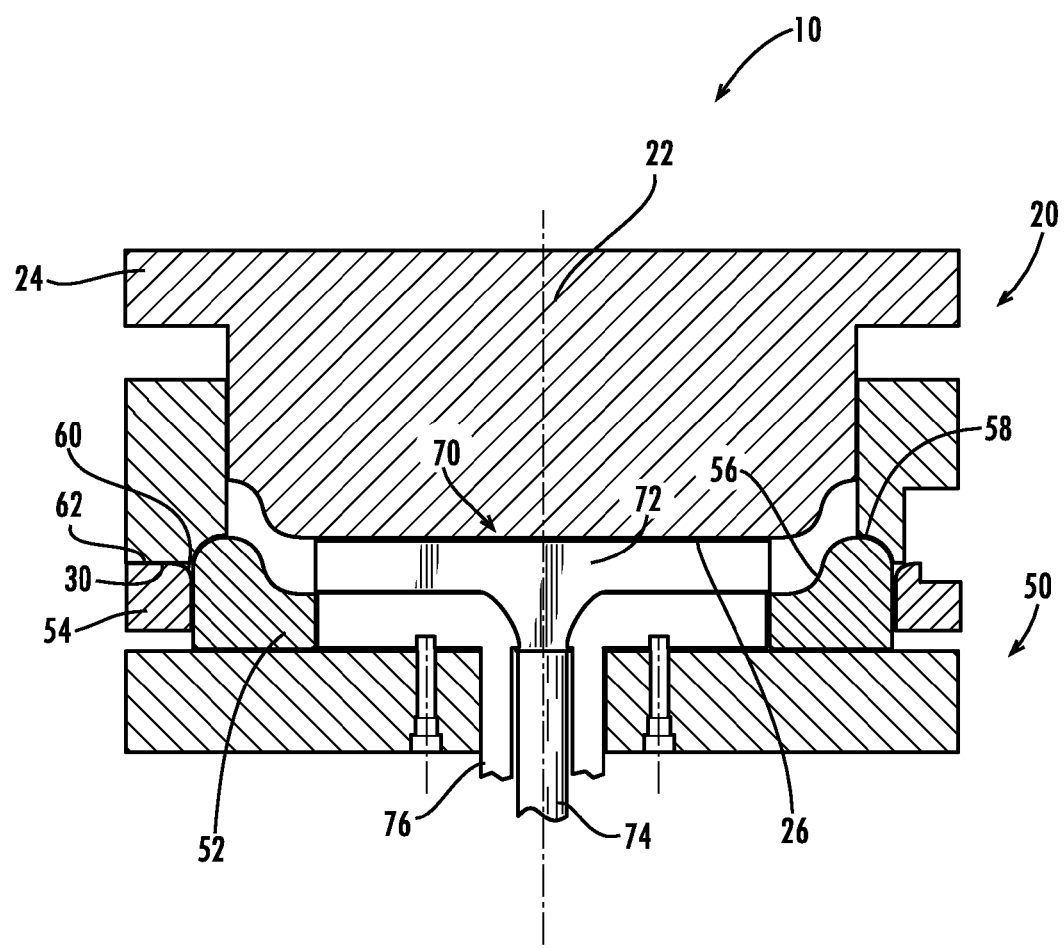
FIG. 3 is a second cross-sectional view of the die press system of FIG. 1, taken at 90° to the view of FIG. 2, and shown in a partially closed configuration.
Figure 4:
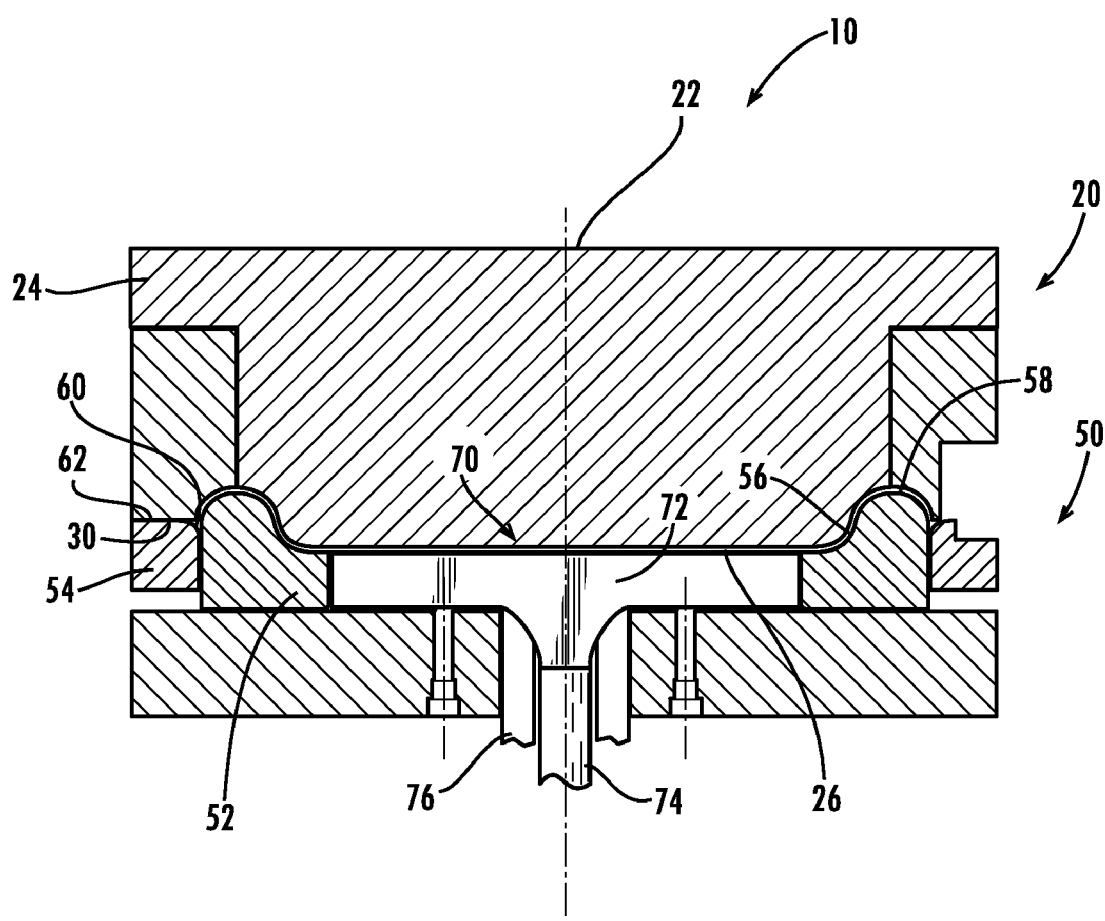
FIG. 4 is a third cross-sectional view of the die press system of FIG. 1, taken at 90° to the view of FIG. 2, and shown in a fully closed configuration.

The present invention may be understood more readily by reference to the following detailed description of the invention taken in connection with the accompanying drawing figures, which form a part of this disclosure. It is to be understood that this invention is not limited to the specific devices, dimensions or parameters described herein and/or shown in the drawing figures. Rather, the description and drawings provided are for the purpose of describing particular embodiments by way of example only, to assist in understanding the claimed invention, and are not intended to be limiting of the invention claimed. Also, the invention includes the overall systems and methods described herein, as well as the individual components and sub-combinations thereof, as claimed. As used herein, the singular forms "a," "an," and "the" are to be interpreted as including the plural, and reference to a particular numerical value includes at least that particular value, unless the context clearly dictates otherwise.

An example embodiment of a forming die assembly 10 according to the present invention is shown in FIGS. 1-4. The forming die assembly 10 generally comprises an upper die half 20 and a lower die half 50. The forming die assembly 10 is shown in an open configuration wherein the upper and lower die halves are disengaged in FIG. 2, in a partially closed configuration in FIG. 3, and in a fully closed configuration wherein the upper and lower die halves are engaged in FIG. 4. One or more such forming die assemblies are preferably oriented on an inclined plane within a forming press system, such that scored paperboard blanks are sequentially fed between the upper and lower die halves 20, 50. The forming press system is cyclically actuated, for example hydraulically or pneumatically. Pressure as well as heat and/or moisture are applied between the upper and lower die halves 20, 50 in a controlled manner to form the paperboard blanks into a shaped paperboard product such as a plate, bowl, platter or other container.

The upper die half 20 generally comprises a male die member or punch 22 and a pressure ring 24 reciprocally mounted around the punch. The punch 22 has a generally convex shaping face 26 defining a curved or shaped profile conforming to the desired product geometry. The pressure ring 24 optionally also includes a shaping face portion 28 for assisting in crimping and forming the rim and edge profile of the product, and/or an engagement face portion 30 for pleating control and gripping the edge of the blank to maintain centering during product formation.

The lower die half 50 generally comprises a female die member 52, and a draw ring 54 reciprocally mounted around the female die member. The die 52 has a generally concave inner shaping face 56 and an outer rim shaping face 58 defining a curved or shaped profile conforming to the desired product rim geometry. The draw ring 54 includes a chamfered inner rim 60 to assist in centering the blanks as they are fed into the die assembly, and an engagement face 62 for contact with the engagement face 30 of the pressure ring 24. The male and female die members are preferably formed of a tough, impact and fatigue resistant material, such as ductile iron.

The forming die assembly 10 further comprises one or more lightweight knockout assemblies 70 to assist in product loading, formation and/or ejection. The lightweight knockout assembly 70 is mounted within the lower die half 50 in the depicted example embodiment. In alternative embodiments of the invention, similar knockout assemblies are included in the upper die half 20, or in both the upper and lower die halves. One or more moving parts of the lightweight knockout assembly 70 have substantially lower mass than corresponding moving parts of previously known mechanisms, thereby reducing wear and fatigue damage to associated components, reducing resultant maintenance requirements, and correspondingly increasing productivity and profitability. For example, and without limitation of the claimed invention by theory or result, embodiments of the lightweight knockout assembly of the present invention may provide at least two to four times the operational life of previously known mechanisms.

Figure 5:
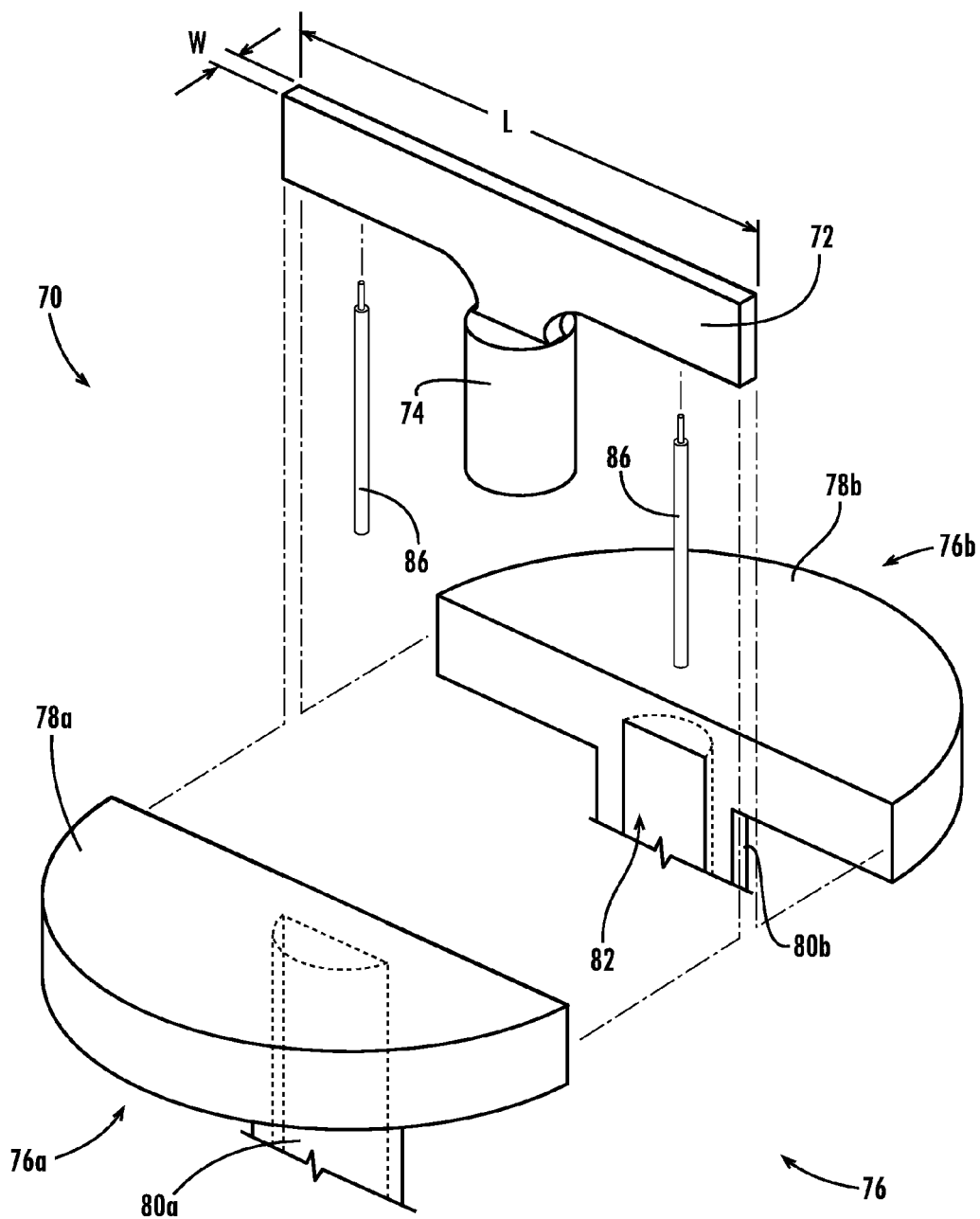
FIG. 5 is an assembly view of the components of a knockout assembly according to an example embodiment of the present invention.
Figure 6A:
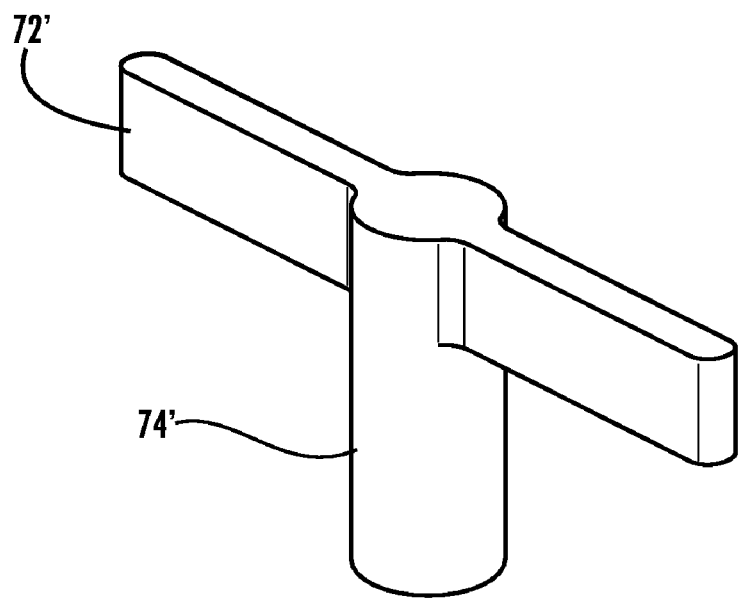
FIG. 6A is a perspective view of an ejection member according to another example embodiment of the invention.
Figure 6B:
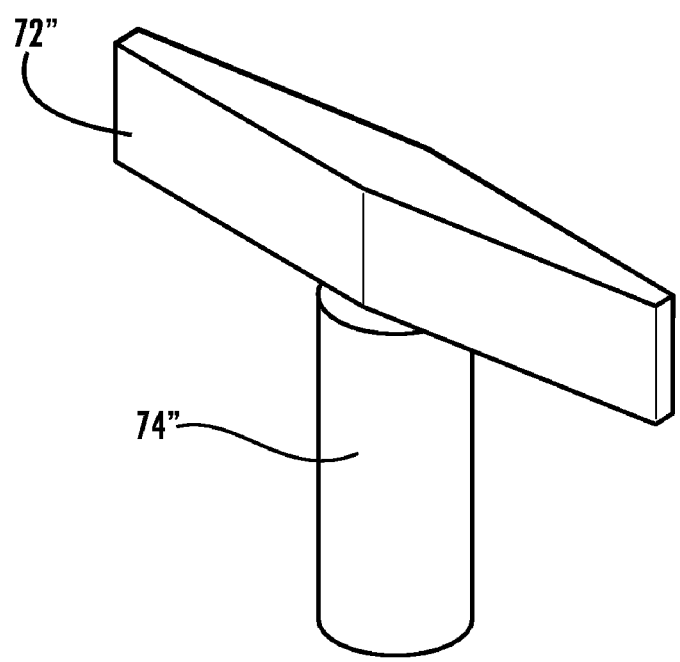
FIG. 6B is a perspective view of an ejection member according to still another example embodiment of the invention.

The lightweight knockout assembly 70, shown in FIG. 5, comprises a bridge knockout or ejection member comprising an ejector body 72 affixed to a cylindrical stem 74, and mounted within a slotted adapter plate 76. The stem 74 is coupled to an actuation member, such as a pneumatic or hydraulic cylinder, drive shaft, spring biased actuator, or other member for reciprocally raising and lowering the ejector body 72 relative to the adapter plate 76 and the lower die half 50. The adapter plate 76 is split into two halves 76a, 76b. Each half of the adapter plate comprises a semi-circular upper plate 78a, 78b, and a semi-cylindrical lower extension 80a, 80b having a channel or bore 82 extending lengthwise therethrough. The adapter plate halves 76a, 76b are bolted or otherwise affixed to the base of the lower die half 50. The adapter plate 76 is suitably formed of the same material as the die member in which it is mounted, for example ductile iron. FIGS. 6A and 6B show alternative ejection member configurations, each comprising an ejector body 72', 72", respectively, affixed to a stem 74', 74". Various other ejection member profiles are within the scope of the invention, and the adapter plate or die member will be configured with a female profile closely corresponding to the male profile of the ejector body.

In example embodiments wherein the lightweight knockout assembly 70 is retrofit to an existing forming die assembly, the adapter plate 76 has an external geometry generally corresponding to that of the existing knockout ejector, such that it can be installed in place thereof without significant modification to the other components of the lower die half. Alternatively, the adapter plate 76 comprises an integrally formed portion of the lower die 52. While the embodiment depicted in the drawing figures shows an adapter plate 76 having an upper plate with a circular periphery, as would typically be used in the production of circular pressware articles, alternate embodiments of the invention will include upper adapter plate plates of oval, rectangular or otherwise shaped overall peripheries, for use in the production of non-circular pressware. In example embodiments, the combined periphery of the upper surface of the adapter plate plates has a length and a width corresponding to (i.e., not greater than) the respective dimension(s) of the bottom panel of the pressware product to be produced.

The ejector body 72 of the lightweight knockout assembly 70 extends through a slot 84 formed between confronting faces of the adapter plate halves 76a, 76b. In alternate embodiments of the invention wherein the adapter plate is an integral portion of the die member, the slot 84 extends through the die face to define the adapter plate portion thereof. In the depicted embodiment of the invention, one generally linear and elongated (i.e., having a length substantially greater than its width, for example at least two times its width) slot 84 is shown. In alternate forms of the invention, two or more slots and/or curved or irregular slots are provided, and receive one or more correspondingly configured ejectors. A close tolerance can be maintained between the ejector and the surrounding slot to minimize embossing of the formed product. Alternatively, the tolerance between the slot and the ejector can be controlled to result in a desired degree of embossing, and the slot and ejector can be configured to emboss a decorative pattern and/or branding indicia onto the product.

The ejector 72 is generally T-shaped when viewed from the side (see FIG. 4), having a length L substantially greater than its width W. For example, in suitable embodiments, the length L of the ejector is at least two times its width W. In example form, the ejector body 72 comprises a generally rectangular elongate linear fin having a height or thickness approximately equal to or less than the thickness of the adapter plate 78, a length L generally matching the length of the upper plate 78 of the adapter plate 76 (the diameter or other major dimension in non-circular embodiments), and a width W substantially less than the width of the adapter plate. The length of the ejector 72 is substantially equal to the length of the slot 84 of the adapter plate 76, with only sufficient clearance therebetween for free operation, and the width W of the ejector is selected to provide a closely-toleranced sliding or running fit of the ejector within the slot. For example, the length L corresponds to the outer dimension of the bottom panel of the pressware product to be formed, such as for example 3" to 12". The width W is preferably no more than about 1", and more preferably no more than about 0.25" to about 0.5". As such, in suitable embodiments, the ratio of L/W is at least about 3:1, more preferably at least about 10:1, and most preferably at least about 20:1. The lengthwise dimensions of the slot 84 and the ejector 72 are aligned in the machine direction, which is the direction of travel of blanks loading into the forming die assembly 10 and formed product discharging out of the forming die assembly, indicated by direction arrow D (the "loading and discharge path") on FIG. 1, so that the blanks and the formed product slide along the length L of the ejector. In this manner, the ejector 72 forms a bridge across the concavity of die member 52, preferably extending generally centrally (diametrically for circular dies) lengthwise across at least about 50%, and more preferably across at least about 75% of the die face.

The stem 74 affixed to the ejector 72 is translationally mounted to reciprocate within the channel 82 of the lower extension 80 of the adapter plate 76 with a close or free-running fit. One or more guide pins 86 are optionally provided, for example extending from the lower face of outer ends of the ejector 72 and sliding within cooperating bores of the lower die half 50, to maintain proper alignment of the ejector during operation. In example embodiments, the ejector 72 is formed of a material of high toughness and fatigue resistance, such as ductile iron; and the stem 74 is formed of a lightweight (i.e., having a lower material density in terms of mass per unit volume, relative to other specified components), high-strength material such as titanium or aluminum. Alternatively, both the ejector 72 and the stem 74 are formed of lightweight, high-strength material(s). The stem 74 and the ejector body 72 can be separate components joined together by fasteners, welding or other attachment means, or can be integrally formed as a unitary component. The stem may comprise a solid rod, or may comprise a hollow tube for lighter weight. Additionally, the ejector 72 and/or the stem 74 may be fabricated with one or more holes, voids or channels therein to further decrease weight.

Various alternative forms of lightweight knockout assemblies are within the scope of the present invention. A reduction in the material volume and/or the material density of the knockout or ejection member relative to previously known knockout or ejection members reduces its mass, and consequently may lead to reduced wear-related damage and less equipment down-time for repair. For example, the lower die half of a press-forming apparatus typically includes a generally planar forming surface that forms the bottom panel of a product. Previously known knockout members typically have a contact face that makes up substantially the entire bottom panel forming surface of the lower die half, resulting in a moving part of considerable mass.

By contrast, in suitable embodiments of the present invention, the bottom panel forming surface of the lower die half comprises the upper faces of the stationary plates 78a, 78b, and the upper surface of the reciprocating ejector 72; with the ejector making up only a portion of the overall bottom panel forming surface, thereby significantly reducing the mass of the moving part. In example forms of the invention, the ejector has a length in the machine direction of at least about 75% of the corresponding length of the bottom panel forming surface, and has a maximum width in the cross-machine direction (i.e., perpendicular to the machine direction) of less than about 50%, more preferably less than about 25%, and most preferably less than about 10%, of the corresponding width of the bottom panel forming surface.

Viewed otherwise, the overall bottom panel forming surface comprises a first surface area and the upper surface of the ejector 72 comprises a second surface area, and the second surface area is no more than about 50%, more preferably no more than about 25%, and most preferably no more than about 10%, of the first surface area. Maintaining the height or thickness of the ejector body approximately equal to or less than the thickness of previously known knockout members thereby results in a considerable reduction in material volume of the moving part, reducing mass (assuming the material density remains constant), and potentially reducing wear-related damage and down-time to a significant extent.

The reduction in mass of the knockout mechanism of the present invention may also be understood in terms of the relative dimensions of the ejector body and stem components thereof. Previously known knockout assemblies for press-forming apparatus typically comprise a circular, oval or otherwise shaped upper plate having a length and a width (in the machine and cross-machine directions, respectively) corresponding to the overall bottom panel forming surface area for the desired product, coupled to the actuator by an about 1½" diameter stem. The length and width of previously known knockout plates are generally considerably greater than the stem diameter, commonly on the order of about 4", about 6" or more, depending on the bottom panel dimensions of the product being formed. By contrast, the ejector body 72 of the knockout mechanism of example forms of the present invention has a width W (in the cross-machine direction) of no greater than the diameter D (or other cross-sectional dimension in the cross-machine direction in the event of a noncircular stem) of the stem 74, measured at the point of connection of the ejector body to the stem. In suitable embodiments of the invention, this ratio of ejector body width to stem dimension (W/D) is less than or equal to about 0.67 (for example, a 1" ejector body width and an about 1½" diameter stem), more preferably less than or equal to about 0.50 (for example, an about 0.75" ejector body width and an about 1½" diameter stem), and most preferably less than or equal to about 0.33 (for example, an about 0.5" ejector body width and an about 1½" diameter stem). In certain embodiments of the invention, the maximum width anywhere on the ejector body is less than the cross-sectional dimension of the stem. In other embodiments, the width of the ejector body is less than the cross-sectional dimension of the stem at their point of connection, but flares wider than the cross-sectional dimension of the stem distal from the connection point.

In operation, the actuation member raises and lowers the ejector body 72 within the slot 84, according to a specified sequence of operation. When the forming die assembly is opened (see FIG. 2), the actuation member raises the ejector 72 into an extended or raised position wherein its distal or top surface is preferably substantially aligned with the plane of the outer rim shaping face 58 of the female die member 52. A paperboard blank is loaded into the forming die, and preferably slides along the length of the raised ejector 72, into position on the female die 52, until the blank contacts positioning pins and/or the inner rim 60 of the draw ring 54. As the forming die assembly moves toward its closed position (see FIG. 3), the actuation member maintains the ejector 72 in its raised position, clamping the blank between the ejector and the shaping face 26 of the upper die half 20 to insure that the blank is held in proper alignment during formation of the product. As the forming die assembly continues to move into its fully closed position to form the final product (see FIG. 4), the actuation member compresses in a controlled manner to retract the ejector 72 into a retracted or forming position wherein its distal or top surface is closely aligned with the plane of the upper surface of the adapter plate 76 and/or the surrounding surface of the female die 52. This close surface alignment, coupled with the close tolerance that is preferably maintained between the width of the ejector 72 and the slot 84, minimizes any marring or damage to the product. As the forming die assembly reopens, the actuation member again raises the ejector 72 into its extended or ejection position, discharging the formed product from the female die 52, and allowing the product to slide along the length of the raised ejector and out of the die assembly for collection and further processing or packaging. The process may then be repeated in a cyclical manner, for example under the control of an electronic or mechanical sequencing controller.

While the invention has been described with reference to preferred and example embodiments, it will be understood by those skilled in the art that a variety of modifications, additions and deletions are within the scope of the invention, as defined by the following claims.

What is claimed is:

1. A press-forming apparatus comprising:
   a male forming member;
   a female forming member, wherein either the male forming member or the female forming member comprises a product-forming surface disposed thereon, the product-forming surface having an elongated slot formed therethrough in a machine direction and wherein the elongated slot is formed between two adapter plates, an upper portion of the adapter plates defining the product-forming surface; and
   an ejector disposed within the elongated slot, wherein the ejector is movable in a direction perpendicular to the product-forming surface.

2. The press-forming apparatus of claim 1, wherein the ejector comprises a rectangular fin body disposed on a stem, wherein the stem is perpendicular to the elongated slot.

3. The press-forming apparatus of claim 1, wherein the ejector is affixed to a stem, and wherein the stem is formed of a lightweight material relative to the ejector.

4. The press-forming apparatus of claim 1, wherein the ejector has a length and a width, and wherein the length is at least three times the width.

5. An apparatus for forming a pressware product, comprising:
   at least one die member having a lightweight knockout assembly mounted therein, said lightweight knockout assembly comprising:
   an adapter plate having a length and a width corresponding to respective dimensions of a bottom panel of the pressware product to be formed; and
   an ejector having a length of at least about 75% the length of the adapter plate and a width of no more than about 50% the width of the adapter plate, wherein the adapter plate comprises first and second portions, and wherein the ejector extends between the first and second portions.

6. The apparatus of claim 5, wherein
a) each of the first and second adapter plate halves comprise a plate portion and an extension portion,
b) the plate portion of each of the first and second adapter plate halves is generally semi-circular and the extension portion of each of the first and second adapter plate halves is semi-cylindrical;
c) the ejector is affixed to a stem; and
d) said stem is translationally mounted within channels in the extension portions.

7. The apparatus of claim 5, wherein the width of the ejector is no more than about 1".

8. The apparatus of claim 5, wherein the pressware product to be formed is circular, and wherein the length and width of the adapter plate are equal and correspond to the diameter of the bottom panel of the circular pressware product.

9. A press-forming apparatus comprising:
a male forming member;
a female forming member, wherein either the male forming member or the female forming member comprises a product-forming surface having an elongated slot extending therethrough in a machine direction, and wherein the elongated slot is formed between two adapter plate halves, an upper portion of the adapter plate halves defining the product-forming surface; and
an ejector movable between a retracted position within the elongated slot and an extended position projecting outward of the elongated slot.

10. The press-forming apparatus of claim 9, wherein the ejector comprises a rectangular fin body disposed on a stem, wherein the stem is perpendicular to the elongated slot.

11. The press-forming apparatus of claim 9, wherein the ejector is affixed to a stem, and wherein the stem is formed of a lightweight material relative to the ejector.

12. The press-forming apparatus of claim 9, wherein the ejector comprises a rectangular body having a length at least three times its width.

13. The press-forming apparatus of claim 9, wherein:
each adapter plate half comprises a plate portion and an extension portion, the plate portion being generally semi-circular and the extension portion being semi-cylindrical;
the ejector is affixed to a stem; and
the stem is translationally mounted within channels in the extension portions.

14. An apparatus for forming a pressware product, comprising:
at least one die member comprising a lightweight knockout assembly mounted therein, said lightweight knockout assembly comprising:
an adapter plate having a length and a width corresponding to respective dimensions of a bottom panel of the pressware product to be formed, wherein the adapter plate comprises first and second adapter plate halves; and
an ejector having a length of at least about 75% the length of the adapter plate and a width of no more than about 50% the width of the adapter plate, wherein the ejector extends between the first and second adapter plate halves.

15. The press-forming apparatus of claim 14, wherein the ejector comprises a rectangular fin body disposed on a stem, wherein the stem is perpendicular to the elongated slot.

16. The press-forming apparatus of claim 14, wherein the ejector is affixed to a stem, and wherein the stem is formed of a lightweight material relative to the ejector.

17. The press-forming apparatus of claim 14, wherein the ejector comprises a rectangular body having a length at least three times its width.

18. The press-forming apparatus of claim 14, wherein:
each adapter plate half comprises a plate portion and an extension portion, the plate portion being generally semi-circular and the extension portion being semi-cylindrical;
the ejector is affixed to a stem; and
the stem is translationally mounted within channels in the extension portions.

* * * * *